(12) United States Patent
Valadez et al.

(10) Patent No.: US 7,711,164 B2
(45) Date of Patent: May 4, 2010

(54) SYSTEM AND METHOD FOR AUTOMATIC SEGMENTATION OF VESSELS IN BREAST MR SEQUENCES

(75) Inventors: Gerardo Hermosillo Valadez, West Chester, PA (US); Xuguang Jiang, Iowa City, IA (US)

(73) Assignee: Siemens Medical Solutiions USA, Inc., Malvern, PA (US)

( * ) Notice: Subject to any disclaimer, the term of this patent is extended or adjusted under 35 U.S.C. 154(b) by 960 days.

(21) Appl. No.: 11/487,719

(22) Filed: Jul. 17, 2006

(65) Prior Publication Data
US 2007/0036409 A1 Feb. 15, 2007

Related U.S. Application Data

(60) Provisional application No. 60/764,122, filed on Feb. 1, 2006, provisional application No. 60/704,930, filed on Aug. 2, 2005.

(51) Int. Cl.
*G06K 9/00* (2006.01)
(52) U.S. Cl. .................................. 382/128; 128/920
(58) Field of Classification Search .............. 378/4, 378/8, 901, 18, 19, 21, 23; 382/128, 130, 382/131, 132, 100, 168, 171, 173, 174, 181, 382/190, 203, 276, 285, 286, 288; 600/407, 600/425; 128/920
See application file for complete search history.

(56) References Cited

U.S. PATENT DOCUMENTS 4,191,887 A * 3/1980 Brown ................. 250/396 ML
5,448,063 A * 9/1995 De Jong et al. ............. 250/305
6,278,890 B1 * 8/2001 Chassaing et al. ........... 600/407
6,478,746 B2 * 11/2002 Chassaing et al. ........... 600/504
6,671,626 B2 * 12/2003 Silverman .................... 702/27
2004/0161141 A1 * 8/2004 Dewaele ..................... 382/132
2004/0252870 A1 * 12/2004 Reeves et al. ............... 382/128
2005/0068031 A1 * 3/2005 Frank ......................... 324/309

FOREIGN PATENT DOCUMENTS

WO WO 01/78005 A2 * 10/2001

OTHER PUBLICATIONS

Gauch et al., "The intensity axis of symmetry and its application to image segmentation", IEEE Transactions on Pattern Analysis and Machine Intelligence, vol. 15, No. 8, pp. 753-770, Aug. 1993.*

(Continued)

*Primary Examiner*—Andrew W Johns
*Assistant Examiner*—Tahmina Ansari (57) ABSTRACT

A method for segmenting digitized images includes providing a digitized image, selecting a point with a median enhancement greater than a predefined threshold, wherein a contrast enhancing agent was applied to the subject matter of said digitized image prior to acquisition of said image, defining a shape matrix for the selected point in said image from moments of the intensities in a window of points about said selected point, calculating eigenvalues of said shape matrix, determining an eccentricity of a structure underlying said point from said eigenvalues, and segmenting said image based on said eccentricity values, wherein the steps of defining a shape matrix, calculating eigenvalues of said shape matrix, and determining the eccentricity of the underlying structure are repeated for all points in said image.

20 Claims, 7 Drawing Sheets

OTHER PUBLICATIONS

Sato et al., "3D Multi-Scale line filter for segmentation and visualization of curvlinear structures in medical images", Medical Image Analysis, vol. 2, No. 2, pp. 143-168, Jun. 1998.*

Arigovindan et al., "Multiresolution Moment Filters: Theory and Applications", IEEE Transactions on Image Processing, vol. 13, No. 4, Apr. 2004, pp. 484-495.

Toumoulin et al., "Fast Detection and Characterization of Vessels in Very Large 3-D Data Sets Using Geometrical Moments", IEEE Transactions on Biomedical Engineering, IEEE Service Center, Piscataway, NJ, US, vol. 48, No. 5, May 2001, pp. 604-606.

Luo et al., Institute of Electrical and Electronics Engineers, "Moment Based 3D Edge Operator for Anistotropic Image", Proceedings of the Annual International Conference of the Engineering in Medicine and Biology Society, Paris, Oct. 29-Nov. 1, 1992, New York, IEEE, US, vol. vol. 5 Conf. 14, Oct. 29, 1992, pp. 2087-2088.

Prokop et al., "A Survey of Moment-Based Techniques for Unoccluded Object Representation and Recognition", CVGIP Graphical Models and Image Processing, Academic Press, Duluth, MA, US, vol. 54, No. 5, Sep. 1, 1992, pp. 438-460.

Suri et al., "A Review on MR Vascular Image Processing: Skeleton Versus Nonskeleton Approaches: Part II", IEEE Transactions on Information Technology in Biomedicine, IEEE Service Center, Los Alamitos, CA, US, vol. 6, No. 4, Dec. 2002, pp. 338-350.

Reuze et al., "3-D Vessel Tracking and Quantitation in Angio MRI", Bioengineering Conference, 1993, Proceedings of the 1993 IEEE Ninteenth Annual Northeast Newark, NJ, USA, Mar. 18-19, 1993, New York, NY, USA, IEEE, Mar. 18, 1993, pp. 43-44.

* cited by examiner

SYSTEM AND METHOD FOR AUTOMATIC SEGMENTATION OF VESSELS IN BREAST MR SEQUENCES

CROSS REFERENCE TO RELATED UNITED STATES APPLICATIONS

This application claims priority from "Automatic segmentation of vessels in breast MR sequences as a false positive elimination technique for automatic lesion detection and segmentation using the shape tensor", U.S. Provisional Application No. 60/764,122 of Hermosillo, et al., filed Feb. 1, 2006, and from "Method for automatic extraction of image structure based on the second order geometric moment", U.S. Provisional Application No. 60/704,930 of Hermosillo, et al., filed Aug. 2, 2005, the contents of both of which are incorporated herein by reference.

TECHNICAL FIELD

This invention is directed to segmentation of digitized medical images.

DISCUSSION OF THE RELATED ART

Contrast enhanced MR sequences are a powerful diagnostic tool for the detection of lesions in breast. Typically, the diagnosis begins by identifying suspicious regions of enhancement in post contrast acquisitions with respect to a pre-contrast one. Automating this process is therefore one that a computer aided detection system needs to perform. A difficulty for such a system is the fact that, besides the lesions, a number of non-suspicious structures also enhance in the post-contrast image. Most of these structures are vessels. Vessels are the main type of false positive structure that arise when automatically detecting lesions as regions that are enhanced after injection of the contrast agent.

Dynamic subtraction of post-contrast T1 weighted images is routinely performed as part of a protocol to evaluate breast lesions with magnetic resonance imaging (MRI). Because lesions usually contain a high vascularity, perfusion of a contrast agent makes the lesions appear brighter than the background and therefore this modality is quite sensitive. Automatically segmenting the lesions can provide the radiologist with accurate automatic measurements and render these measurements more consistent across readers. Region growing segmentation algorithms or even simple thresholding could be used to segment those lesions, if it was not for the fact that the vessels that are attached to them cause the segmentation to leak through the vessels. Removing the vessels could therefore facilitate the segmentation task. On the other hand, automatic detection of the lesions requires the ability to distinguish the lesions from the various types of normal structures that also enhance with the contrast agent. These include breast parenchyma, vessels, the area under the nipples and the area surrounding the heart. There has been interest in developing automatic methods for segmenting the vascular structure in modalities like CT and MR angiography, etc. The literature is very abundant on this subject, describing both automatic and semi-automatic methods, which cover a very wide range of models, assumptions and techniques. In a clinical work-flow context, the extraction of the vascular structure should be fully automatic and require no more than a few seconds of computation time. One technique that performs well, can be easily validated with clinical data, and is easily implemented, involves the use of moments, for which there is little reported in the research literature. Previous approaches based on moments includes the use of moment invariants to extract and characterize vessels in infrared images of laser-heated skin, the use of geometrical moments to extract the vascular structure from large CT data sets, as well as to characterize the vessels, and computing multi-resolution moment filters for the extraction of linear structures from very noisy 2D images.

The use of geometrical moments to extract image structure varies among methods proposed in the literature. Many times, the moments of inertia are computed on a binarized image obtained after thresholding. The problem with this is that the threshold is usually difficult to choose and might not allow detection of small vessels because a low threshold will cause smaller vessels, which tend to have lower intensities, to be merged with neighboring structures. Another problem with thresholding is that the structure becomes "pixelized", i.e. develops sharp edges that render the computation of its shape imprecise with respect to the true shape of the underlying structure.

Figure 1:
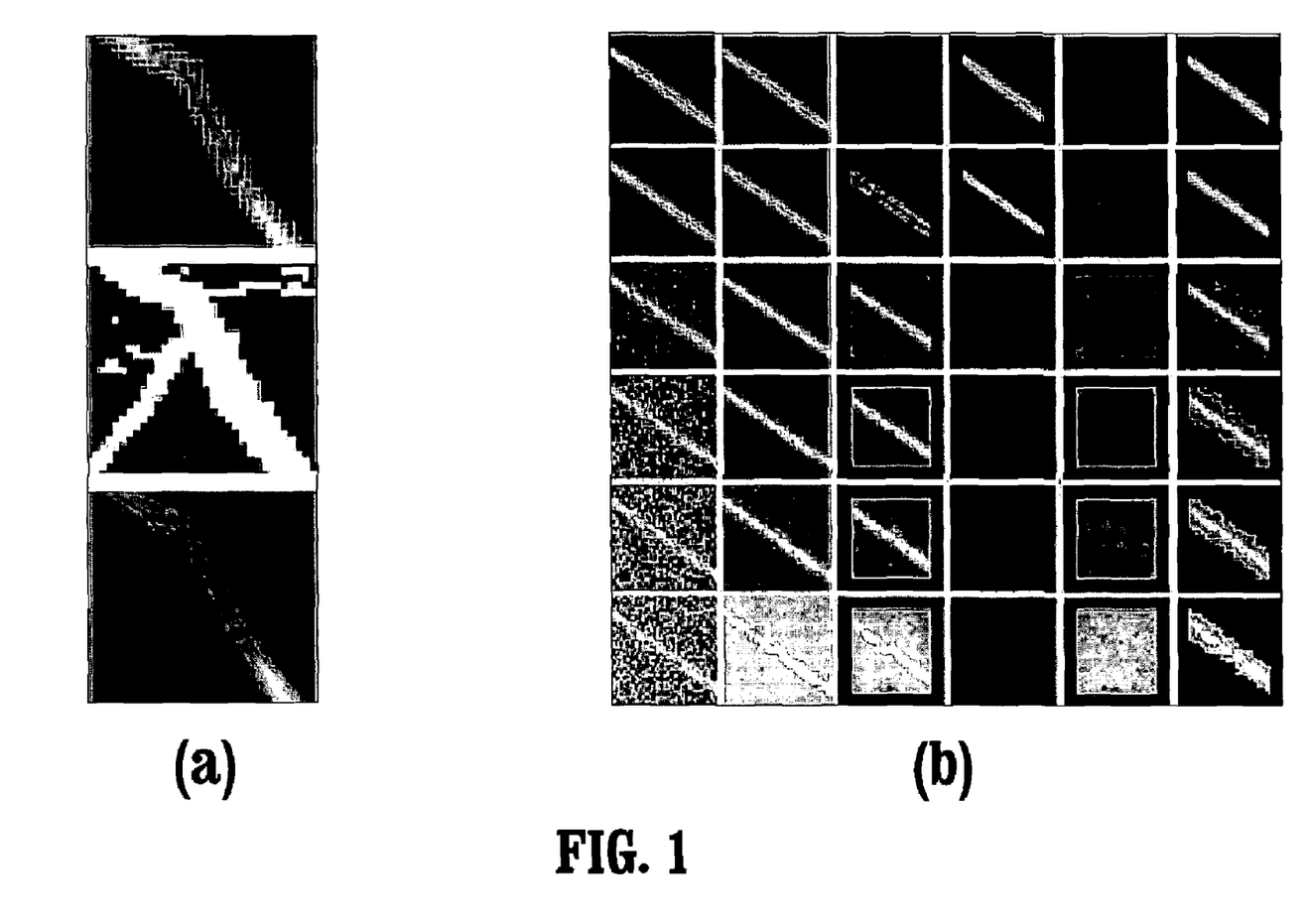
FIG. 1(a) depicts an MIP of a sub-volume extracted from a real image around a vessel junction, according to an embodiment of the invention.
FIG. 1(b) depicts a simulated vessel and its detection using moments of inertia without thresholding, according to an embodiment of the invention.

An alternative to thresholding is to compute the moments using the image intensity function $f$ as density function. However, in regions where the signal-to-noise (SN) ratio is low, it becomes difficult to establish a threshold on the eccentricity of a fitted ellipse to detect elongated structures. For example, FIG. 1(a) depicts an MIP of a sub-volume extracted from a real image around a vessel junction. The top row depicts the original voxel values using nearest-neighbor interpolation. The middle row depicts the binary image obtained after manual thresholding. The threshold was adjusted to capture both vessels, a task that is quite difficult to achieve automatically. The pixelization effect of the thresholding is evident, which affects the precision of the shape descriptors. The third row shows the same sub-volume using a more sophisticated interpolation scheme.

SUMMARY OF THE INVENTION

Exemplary embodiments of the invention as described herein generally include methods and systems for automatic detection of bright tubular structures and its performance for automatic segmentation of vessels in breast MR sequences based on geometrical moments for the extraction of tubular structures from images. A method according to an embodiment of the invention is based on the eigenvalues of the shape tensor, and reconciles not having to threshold the image with reliably recovering structure under very low signal to noise (SN) ratios. A method according to an embodiment of the invention does not rely on image derivatives of either first order, like methods based on the eigenvalues of the mean structure tensor, or second order, like methods based on the eigenvalues of the Hessian, and the smoothing of the output which is inherent to approaches based on the Hessian or structure tensor is avoided. A method according to an embodiment of the invention can execute quickly, needing only a few seconds per sequence. Testing results based motion-corrected breast MR sequences indicate that a method according to an embodiment of the invention reliably segments vessels while leaving lesions intact, and out-performs differential techniques both in sensitivity and localization precision and is less sensitive to scale selection parameters.

According to an aspect of the invention, there is provided a method for segmenting digitized images including providing a digitized image comprising a plurality of intensities corresponding to a domain of points on a 3-dimensional grid, defining a shape matrix for a selected point in said image from moments of the intensities in a window of points about said selected point, calculating eigenvalues of said shape matrix, determining an eccentricity of a structure underlying said point from said eigenvalues, and segmenting said image based on said eccentricity values, wherein the steps of defining a shape matrix, calculating eigenvalues of said shape matrix, and determining the eccentricity of the underlying structure are repeated for all points in said image.

According to a further aspect of the invention, the selected point has a median enhancement greater than a predefined threshold, wherein a contrast enhancing agent was applied to the subject matter of said digitized image prior to acquisition of said image.

According to a further aspect of the invention, the median enhancement is calculated by taking a difference of a median value of said contrast enhanced image and a median value of a pre-contrast enhanced image, and normalizing said difference to be within a predefined range.

According to a further aspect of the invention, the shape matrix $S_\alpha$ is defined as $$S_\alpha = \begin{pmatrix} \mu_{xx,\alpha} & \mu_{xy,\alpha} & \mu_{xz,\alpha} \\ \mu_{xy,\alpha} & \mu_{yy,\alpha} & \mu_{yz,\alpha} \\ \mu_{xz,\alpha} & \mu_{yz,\alpha} & \mu_{zz,\alpha} \end{pmatrix}, \text{ wherein}$$

$$\mu_{xx,\alpha} = \frac{m_{2,0,0,\alpha}}{m_{0,0,0,\alpha}} - \frac{m_{1,0,0,\alpha}^2}{m_{0,0,0,\alpha}^2}$$

$$\mu_{xy,\alpha} = \frac{m_{1,1,0,\alpha}}{m_{0,0,0,\alpha}} - \frac{m_{1,0,0,\alpha} m_{0,1,0,\alpha}}{m_{0,0,0,\alpha}^2}, \mu_{yy,\alpha} = \frac{m_{0,2,0,\alpha}}{m_{0,0,0,\alpha}} - \frac{m_{0,1,0,\alpha}^2}{m_{0,0,0,\alpha}^2},$$

$$\mu_{xz,\alpha} = \frac{m_{1,0,1,\alpha}}{m_{0,0,0,\alpha}} - \frac{m_{1,0,0,\alpha} m_{0,0,1,\alpha}}{m_{0,0,0,\alpha}^2},$$

$$\mu_{yz,\alpha} = \frac{m_{0,1,1,\alpha}}{m_{0,0,0,\alpha}} - \frac{m_{0,1,0,\alpha} m_{0,0,1,\alpha}}{m_{0,0,0,\alpha}^2}, \mu_{zz,\alpha} = \frac{m_{0,0,2,\alpha}}{m_{0,0,0,\alpha}} - \frac{m_{0,0,1,\alpha}^2}{m_{0,0,0,\alpha}^2},$$

wherein moments $m_{p,q,r,\alpha}$ are defined as $m_{p,q,r,\alpha}(x_0, y_0, z_0) = \int_{R^3} (x-x_0)^p (y-y_0)^q (z-z_0)^r f(x, y, z)^\alpha w(x-x_0, y-y_0, z-z_0) dx dy dz,$ wherein w is a window function with compact support, p, q, r$\mu$0 and $\alpha\mu$1.

According to a further aspect of the invention, the integral is calculated by a sum over a finite neighborhood about each point.

According to a further aspect of the invention, the window function is defined by $$w(x, y, z) = \begin{cases} 1 & \text{if } \begin{cases} x \in [-N_x v_x, N_x v_x] \\ y \in [-N_y v_y, N_y v_y] \\ z \in [-N_z v_z, N_z v_z] \end{cases} \\ 0 & \text{otherwise} \end{cases}$$

wherein $v_x$, $v_y$, $v_z$ are image point spacings, $N_x$, $N_y$, $N_z$ are non-negative integers defined wherein a window size contains a largest diameter of interest.

According to a further aspect of the invention, the method comprises computing said moments using nearest neighbor interpolation, and correcting said shape matrix according to $$\hat{S}_\alpha + \frac{1}{12} \begin{pmatrix} v_x^2 & 0 & 0 \\ 0 & v_y^2 & 0 \\ 0 & 0 & v_z^2 \end{pmatrix},$$

wherein $v_x$, $v_y$, $v_z$ are image point spacings.

According to a further aspect of the invention, the method comprises computing said moments using trilinear interpolation.

According to a further aspect of the invention, $\alpha=1$, and correcting said shape matrix according to $$\hat{S}_\alpha + \frac{1}{6} \begin{pmatrix} v_x^2 & 0 & 0 \\ 0 & v_y^2 & 0 \\ 0 & 0 & v_z^2 \end{pmatrix},$$

wherein $v_x$, $v_y$, $v_z$ are image point spacings.

According to another aspect of the invention, there is provided a program storage device readable by a computer, tangibly embodying a program of instructions executable by the computer to perform the method steps for segmenting digitized images.

DETAILED DESCRIPTION OF THE PREFERRED EMBODIMENTS

Exemplary embodiments of the invention as described herein generally include systems and methods for automatic detection of bright tubular structures and its performance for automatic segmentation of vessels in breast MR sequences. A method according to an embodiment of the invention is based on the eigenvalues of a shape tensor. It can be compared to methods based on the eigenvalues of the mean Hessian and those based on the eigenvalues of the mean structure tensor. The Hessian, being defined from the second-order derivatives, can be regarded as a structure descriptor of order two. Similarly, the structure tensor is a structure descriptor of order one. The shape tensor can be regarded as a structure descriptor of order zero.

As used herein, the term "image" refers to multi-dimensional data composed of discrete image elements (e.g., pixels for 2-D images and voxels for 3-D images). The image may be, for example, a medical image of a subject collected by computer tomography, magnetic resonance imaging, ultrasound, or any other medical imaging system known to one of skill in the art. The image may also be provided from non-medical contexts, such as, for example, remote sensing systems, electron microscopy, etc. Although an image can be thought of as a function from $R^3$ to R, the methods of the inventions are not limited to such images, and can be applied to images of any dimension, e.g. a 2-D picture or a 3-D volume. For a 2- or 3-dimensional image, the domain of the image is typically a 2- or 3-dimensional rectangular array, wherein each pixel or voxel can be addressed with reference to a set of 2 or 3 mutually orthogonal axes. The terms "digital" and "digitized" as used herein will refer to images or volumes, as appropriate, in a digital or digitized format acquired via a digital acquisition system or via conversion from an analog image.

A method according to an embodiment of the invention works on the image intensities by computing second-order geometric moments of the underlying (bright) structure. A method can be applied to a binarized image obtained by applying a threshold to the initial post-contrast enhanced image, but a method can be applied without this threshold. The eigenvalues of the second-order geometric moments are a classical tool for shape characterization in object recognition. They, however, have never been applied as a filter for extracting image structure. Given a binary image, a small sub-volume around each pixel (its size being related to the structures of interest) is considered and a shape tensor is defined at that location as the second-order moments of the positions of the bright voxels with respect to the center of the sub-volume. For voxels in which the center pixel is both bright and lies close enough to the center of the underlying shape, eigenvalues of the shape tensor are computed and assigned the value $\lambda_1 - \lambda_2/(\lambda_1 + \lambda_2)$ to the filter response, where $\lambda_2 > \lambda_1$ are the largest eigenvalues.

According to an embodiment of the invention, a geometrical 3D moment can be defined as:

$$m_{p,q,r,\alpha}(x_0, y_0, z_0) = \int_{R^3} (x-x_0)^p (y-y_0)^q (z-z_0)^r f(x,y,z)^\alpha w(x-x_0, y-y_0, z-z_0) dx dy dz,$$

where w is a positive and symmetric window function with compact support that provides localization, p, q, r$\mu$0 and $\alpha\mu$1. The shape tensor of order $\alpha$ is defined in terms of these moments as $$S_\alpha = \begin{pmatrix} \mu_{xx,\alpha} & \mu_{xy,\alpha} & \mu_{xz,\alpha} \\ \mu_{xy,\alpha} & \mu_{yy,\alpha} & \mu_{yz,\alpha} \\ \mu_{xz,\alpha} & \mu_{yz,\alpha} & \mu_{zz,\alpha} \end{pmatrix}, \text{ where}$$

$$\mu_{xx,\alpha} = \frac{m_{2,0,0,\alpha}}{m_{0,0,0,\alpha}} - \frac{m_{1,0,0,\alpha}^2}{m_{0,0,0,\alpha}^2}$$

$$\mu_{xy,\alpha} = \frac{m_{1,1,0,\alpha}}{m_{0,0,0,\alpha}} - \frac{m_{1,0,0,\alpha} m_{0,1,0,\alpha}}{m_{0,0,0,\alpha}^2} \quad \mu_{yy,\alpha} = \frac{m_{0,2,0,\alpha}}{m_{0,0,0,\alpha}} - \frac{m_{0,1,0,\alpha}^2}{m_{0,0,0,\alpha}^2}$$

$$\mu_{xz,\alpha} = \frac{m_{1,0,1,\alpha}}{m_{0,0,0,\alpha}} - \frac{m_{1,0,0,\alpha} m_{0,0,1,\alpha}}{m_{0,0,0,\alpha}^2} \quad \mu_{yz,\alpha} = \frac{m_{0,1,1,\alpha}}{m_{0,0,0,\alpha}} - \frac{m_{0,1,0,\alpha} m_{0,0,1,\alpha}}{m_{0,0,0,\alpha}^2} \quad \mu_{zz,\alpha} = \frac{m_{0,0,2,\alpha}}{m_{0,0,0,\alpha}} - \frac{m_{0,0,1,\alpha}^2}{m_{0,0,0,\alpha}^2}$$

This matrix is symmetric, so all of its eigenvalues are real. Letting the three eigenvalues be $\lambda_3 > \lambda_2 > \lambda_1 \mu 0$, a filter response can be defined by $$C_{line} = \frac{\lambda_3 - \lambda_2}{\lambda_3 + \lambda_2}.$$

For a line or cylindrical like structure such as a vessel, $C_{line} \lambda 1$.

According to an embodiment of the invention, the eccentricity of the underlying shape is computed based on the eigenvalues $0[\lambda_1[\lambda_2[\lambda_3$ of $S_\alpha$, with $\alpha \gg 1$. As $\alpha$ becomes larger, the higher intensity values are given more importance, acting almost like a thresholding. High values of $\alpha$ can cope with very low SN ratios as shown in the simulated experiment of FIG. 1(b), were a synthetic tubular structure with added uniform noise is detected with the classic matrix of inertia and the shape tensor at $\alpha=15$.

FIG. 1(b) depicts a simulated vessel and its detection with the standard moments of inertia without thresholding and with the shape tensor at $\alpha=15$. The columns show from left to right: (1) the center slice of the original synthetic volume, (2) its maximum intensity projection (MIP), (3) the MIP of the volume with the vessel removed by the standard moment method, (4) the MIP of the detected vessel by the moment method, (5) the MIP of the volume with the vessel removed using the shape tensor with $\alpha=15$, and (6) the MWP of the detected vessel using shape tensor with $\alpha=15$. The six rows represent increasing levels of additive uniform noise, giving respectively SN ratios of, from top to bottom: (1) 56.3, (2) 36.7, (3) 20.4, (4) 11.6, (5) 5.5 and (6) 0.8 dB. The threshold on the eccentricity of the shape is the same across rows for each algorithm. In all cases the detection criterion was $$\frac{\lambda_3}{\lambda_2} > 15$$

for $S_{15}$ and $$\frac{\lambda_3}{\lambda_2} > 2$$

for the matrix of inertia corresponding to $S_1$. This improved detection performance has been noticed in real cases.

In practice, the above integral is usually replaced by a sum over a finite neighborhood around each voxel since $f$ is only known at voxel locations. It can be assumed for all experiments that the localization function is given by $$w(x,y,z) = \begin{cases} 1 & \text{if } \begin{cases} x \in [-N_x v_x, N_x v_x] \\ y \in [-N_y v_y, N_y v_y] \\ z \in [-N_z v_z, N_z v_z] \end{cases} \\ 0 & \text{otherwise} \end{cases}$$

where $v_x$, $v_y$, $v_z$ are the image voxel spacings and $N_x$, $N_y$, $N_z$ are non-negative integers defined such that the window size contains the largest diameter of interest. Then, given an image, consider a small sub-volume around each pixel and define $$\hat{m}_{p,q,r,\alpha} = \sum_{i=1}^{2N_x} \sum_{j=0}^{2N_y} \sum_{k=0}^{2N_z} (iv_x)^p (jv_y)^q (kv_z)^r \rho_{ijk}^\alpha,$$

where $\rho_{ijk}$ is the value of the image at the voxel corresponding to the indexes i,j,k. The eigenvalues $0[\lambda_1[\lambda_2[\lambda_3$ of the matrix $$S_\alpha = \begin{pmatrix} \hat{\mu}_{xx,\alpha} & \hat{\mu}_{xy,\alpha} & \hat{\mu}_{xz,\alpha} \\ \hat{\mu}_{xy,\alpha} & \hat{\mu}_{yy,\alpha} & \hat{\mu}_{yz,\alpha} \\ \hat{\mu}_{xz,\alpha} & \hat{\mu}_{yz,\alpha} & \hat{\mu}_{zz,\alpha} \end{pmatrix},$$

are computed where the values $\hat{\mu}_{\ldots}$ are computed as above but using the summation moments. The eccentricity or elongation of the underlying structure can be measured by the classic eccentricity measure $\epsilon = (\lambda_3 - \lambda_2)/(\lambda_3 + \lambda_2)$, which takes values between 0 and 1, or simply by the ratio $\lambda_3/\lambda_2$, provided that $\lambda_2 > 0$.

Since moment based methods do not assume differentiability of the image intensity function $f$, simple interpolation schemes can be used such as nearest-neighbor or tri-linear, to compute integrals of the interpolated function instead of sums over the voxel values. One may expect better precision using the value of these integrals, especially in the case of tri-linear interpolation. Using the equalities $$\int_{(i-1/2)v_x}^{(i+1/2)v_x} dx = v_x,$$

$$\int_{(i-1/2)v_x}^{(i+1/2)v_x} x\,dx = v_x^2 i,$$

$$\int_{(i-1/2)v_x}^{(i+1/2)v_x} x^2 dx = v_x^3 \left(i^2 + \frac{1}{12}\right),$$

it can be seen that, for the nearest-neighbor interpolation integral, the matrix $\hat{S}_\alpha$ above should be replaced by $$\hat{S}_\alpha + \frac{1}{12} \begin{pmatrix} v_x^2 & 0 & 0 \\ 0 & v_y^2 & 0 \\ 0 & 0 & v_z^2 \end{pmatrix}.$$

In the case of tri-linear interpolation, the function $f$ is given by $\Sigma_{i,j,k} \rho_{ijk} g_{ijk}$, where i,j,k are the indices of the image voxels, $\rho_{ijk}$ is the image value at a voxel and $$g_{i,j,k}(x, y, z) = \begin{cases} \left(1 - \frac{|x - v_x i|}{v_x}\right)\left(1 - \frac{|y - v_y j|}{v_y}\right)\left(1 - \frac{|z - v_z k|}{v_z}\right) \\ 0 \text{ otherwise} \end{cases}$$

if $$\begin{cases} x \in [(i-1)v_x, (i+1)v_x] \\ y \in [(j-1)v_y, (j+1)v_y] \\ z \in [(k-1)v_z, (k+1)v_z] \end{cases}$$

Then, writing $$\int_{xyz} (\cdot) \equiv \int_{(k-1)v_z}^{(k+1)v_z} \int_{(j-1)v_y}^{(j+1)v_y} \int_{(i-1)v_x}^{(i+1)v_x} (\cdot) dx\,dy\,dz;$$

$$\int_{xyz} g_{ijk} = v_x v_y v_z,$$

$$\int_{xyz} x g_{ijk} = i v_x^2 v_y v_z,$$

$$\int_{xyz} xy g_{ijhk} = ij v_x^2 v_y^2 v_z,$$

$$\int_{xyz} x^2 g_{ijk} = \left(i^2 + \frac{1}{6}\right) v_x^3 v_y v_z,$$

so that, for tri-linear interpolation in the case $\alpha=1$, the matrix $\hat{S}_\alpha$ should be replaced by $$\hat{S}_\alpha + \frac{1}{6} \begin{pmatrix} v_x^2 & 0 & 0 \\ 0 & v_y^2 & 0 \\ 0 & 0 & v_z^2 \end{pmatrix}.$$

The situation becomes more complex in the case of the general shape tensor ($\alpha > 1$) using tri-linear interpolation, in which $f^\alpha$ is given by $(\Sigma_{i,j,k} \rho_{ijk} g_{ijk})^\alpha$. Although the corresponding integrals are still computable in closed form, the complexity is increased significantly. According to an embodiment of the invention, to compute the corresponding shape tensor, note that it is no longer useful to compute moments of $g_{ijk}^\alpha$, as in the case $\alpha=1$ above. To proceed, the above moments can be obtained using a less direct method but which can be generalized to $\alpha > 1$. This can be done in the 1-D case, with the 2-D and 3-D cases being straightforward generalizations thereof. Assuming $\rho_k = 0$ for $k < i-2$ or $k > i+2$, one obtains $$\int_{(i-2)v_x}^{(i+2)v_x} f(x)dx = \sum_{k=i-1}^{i+1} \int_{(k-1)v_x}^{(k+1)v} \rho_k g_k(x) dx$$

$$= \int_{(i-2)v_x}^{(i-1)v_x} \rho_{i-1} g_{i-1}(x) dx + \int_{(i-1)v_x}^{iv_x}$$

$$(\rho_{i-1} g_i(x) + \rho_i g_i(x)) dx + \int_{v_x}^{(i+1)v_x}$$

$$(\rho_i g_i(x) + \rho_{i+1} g_{i+1}(x)) dx + \int_{(i+1)v_x}^{(i+2)v_x}$$

$$\rho_{i+1} g_{i+1}(x) dx$$

$$= v_x (\rho_{i-1} + \rho_i + \rho_{i+1}).$$

Figure 2:
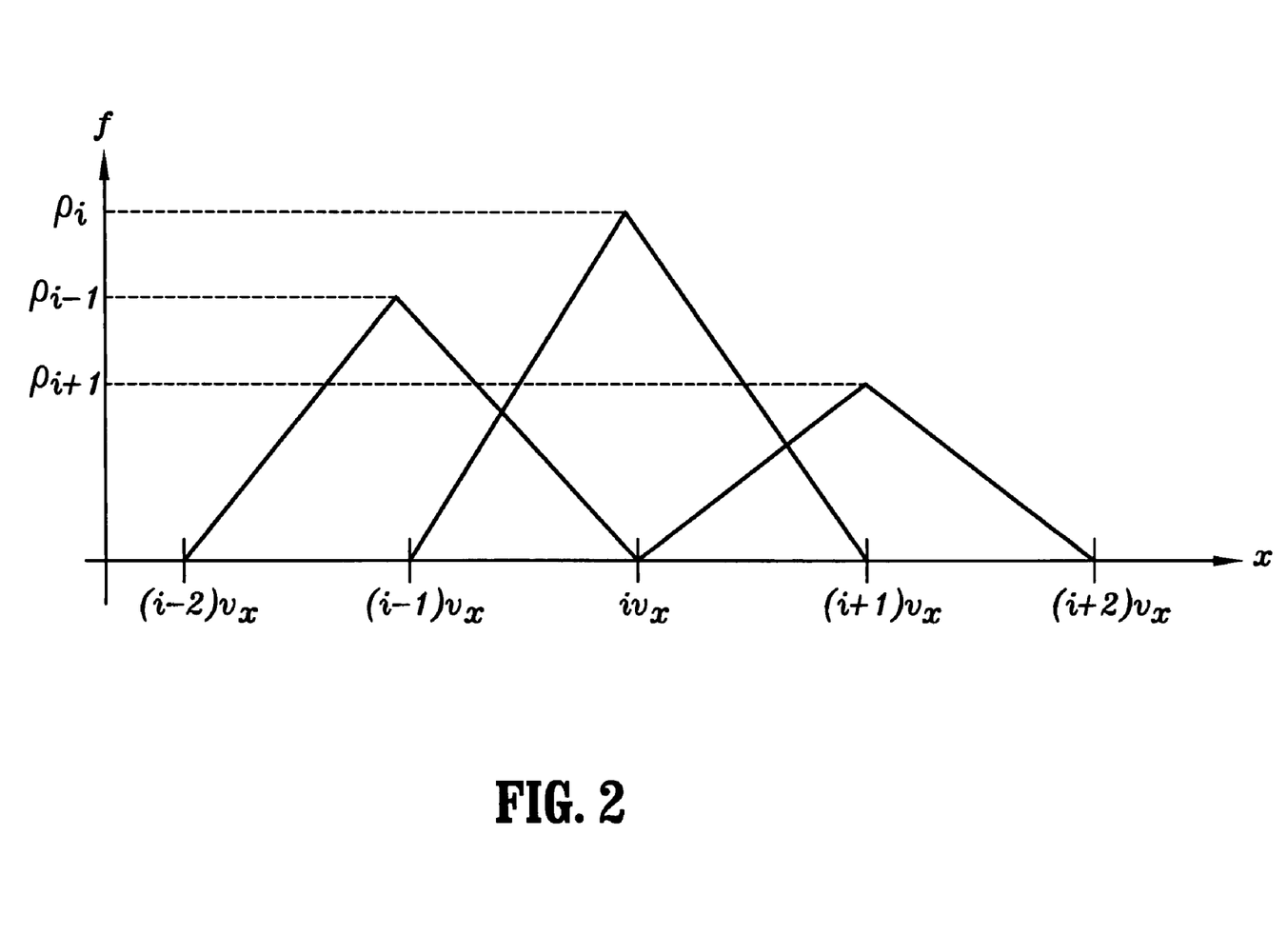
FIG. 2 illustrates basis functions used for 1D linear interpolation, according to an embodiment of the invention.

The four integrals above can be obtained from the 3 piecewise-linear basis functions illustrated in FIG. 2. Referring to the figure, the first basis function $g_{i-1}$ is defined over the domain $(i-2)v_x$ to $iv_x$, the second basis function $g_i$ is defined over the domain $(i-1)v_x$ to $(i+1)v_x$, and the third function $g_{i+1}$ is defined over the domain $iv_x$ to $(i+2)v_x$.

This method of computing the integral can be generalized to $\alpha > 1$. For instance, one can compute:

$$\int_{(i-2)v_x}^{(i+2)v_x} (f(x))^2 dx = \int_{(i-2)v_x}^{(i-1)v_x} (\rho_{i-1} g_{i-1}(x))^2 dx +$$

$$\int_{(i-1)v_x}^{iv_x} (\rho_{i-1} g_i(c) + \rho_{i+1} g_{i+1}(x))^2 dx +$$

$$\int_{(i+1)v_x}^{(i+2)v_x} (\rho_{i+1} g_{i+1}(x))^2 dx$$

$$= \left( \frac{2}{3}\rho_{i-1}^2 + \frac{1}{3}\rho_{i-1}\rho_i + \frac{2}{3}\rho_i^2 + \frac{1}{3}\rho_i\rho_{i+1} + \frac{2}{3}\rho_{i+1}^2 \right) v_x$$

Similarly, $$\int_{(i-2)v_x}^{(i+2)v_x} x f(x)^2 dx =$$

$$\left( i\rho_i^2 + (i-1)\rho_{i-1}^2 + \left(\frac{1}{2}i - \frac{1}{4}\right)\rho_{i-1}\rho_i + \left(\frac{1}{2}i + \frac{1}{4}\right)\rho_i\rho_{i+1} + (i+1)\rho_{i+1}^2 \right) v_x^2,$$

and $$\int_{(i-2)v_x}^{(i+2)v_x} x^2 f(x)^2 dx =$$

$$\left\{ \begin{array}{c} \left(\frac{11}{15} + \frac{4}{3}i + \frac{2}{3}i^2\right)\rho_{i+1}^2 + \left(\frac{1}{10} + \frac{1}{3}i + \frac{1}{3}i^2\right)\rho_i\rho_{i+1} + \\ \left(\frac{1}{15} + \frac{2}{3}i^2\right)\rho_i^2 + \left(\frac{1}{10} - \frac{1}{3}i + \frac{1}{3}i^2\right) \\ \rho_{i-1}\rho_i + \left(\frac{11}{15} - \frac{4}{3}i + \frac{2}{3}i^2\right)\rho_{i-1}^2 \end{array} \right\} v_x^3$$

Although generalized formulas could potentially be found for the 3-D case and a given α>1, the complexity of the resulting polynomials is quite high for the potential precision improvement. In the 2-D case, the four integrals above become sixteen integrals, and become sixty-four integrals in 3D.

A method according to an embodiment of the invention has been tested on more than 100 motion-corrected breast MR dynamic sequences. The results obtained show that vessels can be reliably segmented while leaving lesions intact. According to an embodiment of the invention, moments are computed on a sliding window of fixed size, but only points for which the median enhancement is higher than a given threshold are considered. This threshold can be chosen low enough so as to detect even small vessels. It is not difficult to set because it is not relied upon for the computations but only to accelerate the whole process, by treating fewer voxels. The median enhancement is calculated by taking the median value of the post-contrast acquisitions minus the value of the pre-contrast acquisition at each image voxel. This difference is then normalized by applying an affine function such that the resulting enhancement is in the range [0, 200]. FIGS. 3(a)-(c), 4(a)-(c), and 5 show a few representative examples of the results.

Figure 3:
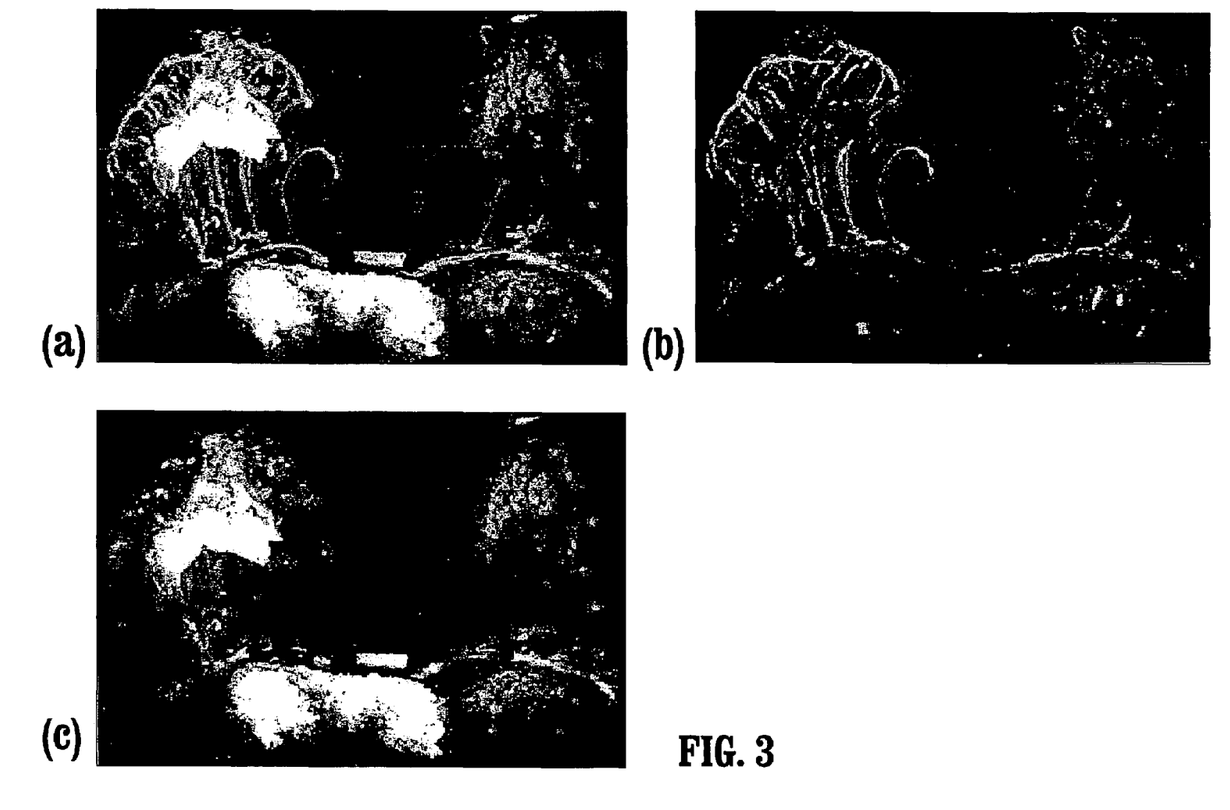
FIGS. 3(a)-(c) depict segmentation of a large lesion, according to an embodiment of the invention.
Figure 4:
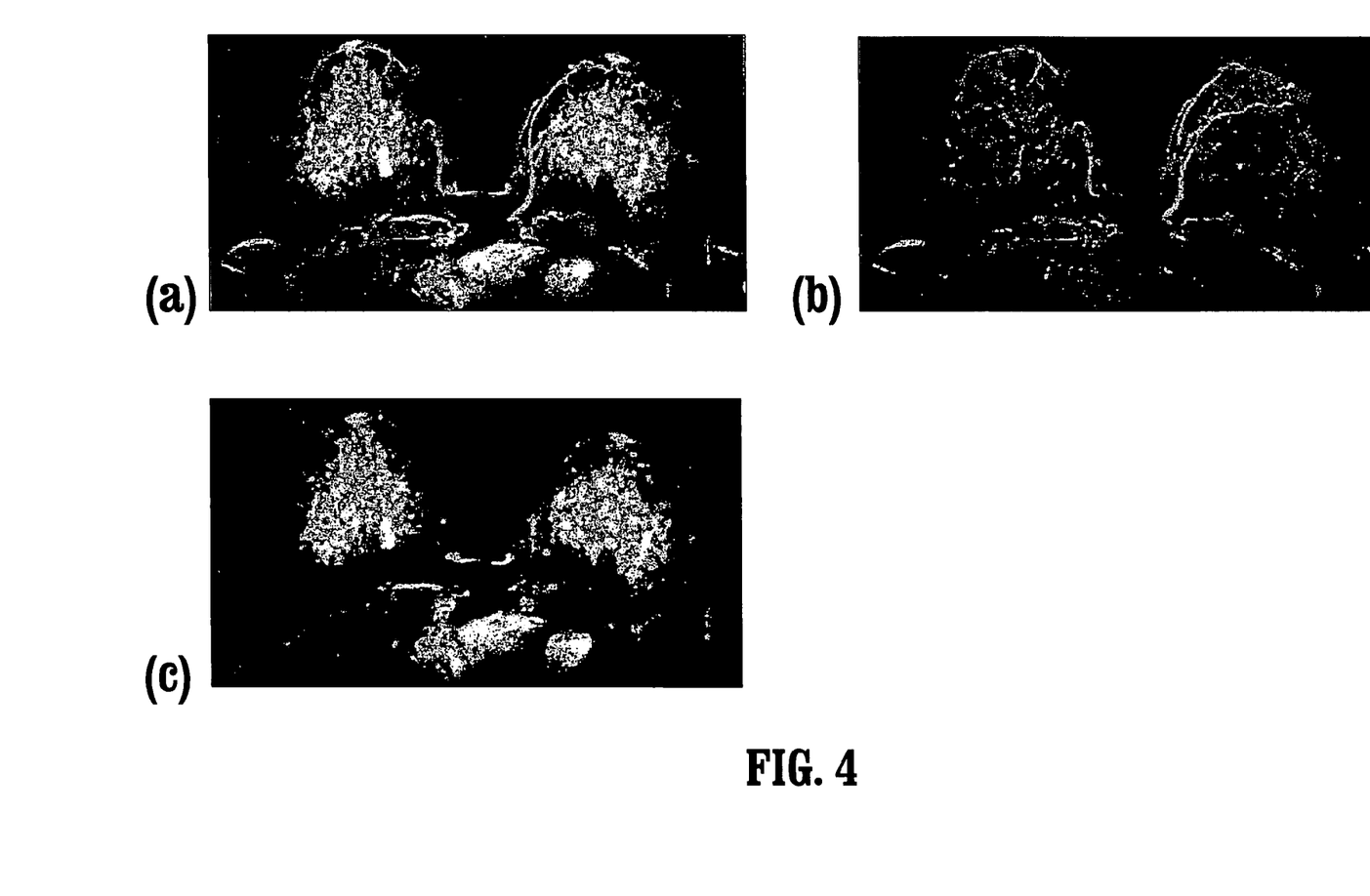
FIGS. 4(a)-(c) depicts segmentation of multiple small lesions, according to an embodiment of the invention.

FIGS. 3(a)-(c) depict segmentation of a large lesion, while FIGS. 4(a)-(c) depicts segmentation of multiple small lesions. For both of these figures, panel (a) depicts a thresholded initial post-contrast enhancement image, panel (b) depicts the detected vessels, and panel (c) depicts the lesions with the vessels removed.

Figure 5:
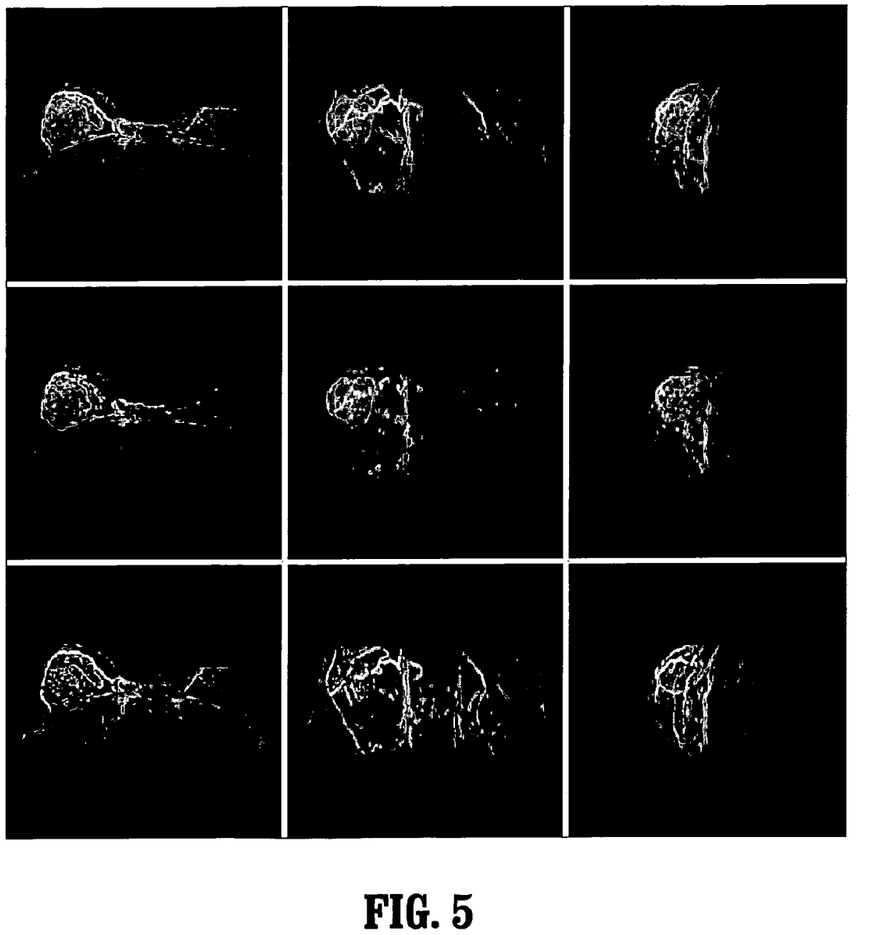
FIG. 5 depicts segmentation of the vascular structure in breast MRI using the shape tensor, according to an embodiment of the invention.

FIG. 5 illustrates segmentation of the vascular structure in breast MRI using the shape tensor with α=6. The three columns show orthogonal views of the same patient. The first row shows the original MIP of the median enhancement. The second row shows the same volume with automatically removed vessels. The third row shows a MIP of the removed vessels alone. Notice that vessels of very different diameters and enhancement levels are correctly segmented. The detection was performed by taking locations for which the eigenvalues of the shape tensor were such that $\lambda_3/\lambda_2 > 3$.

In each of these figures, note how even small vessels are correctly segmented and even small spherical structures are left intact. As a further validation, a method according to an embodiment of the invention extracted the vascular structure on 40 cases reviewed by three radiologists who marked a total of 75 lesions. The vessels were correctly segmented in all the cases and all the marked lesions were left intact.

Figure 6:
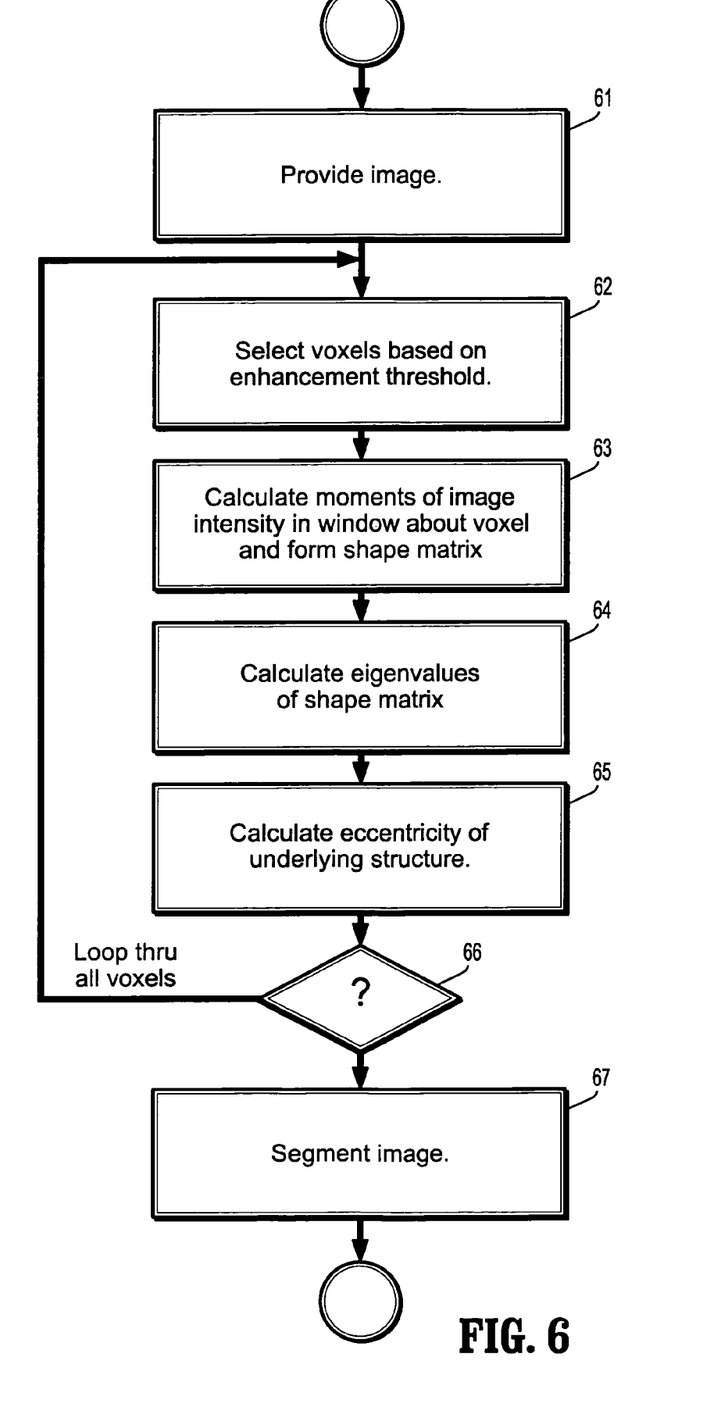
FIG. 6 depicts a flow chart of a method for a moment-based segmentation according to an embodiment of the invention.

A flow chart of a moment-based segmentation method according to an embodiment of the invention is depicted in FIG. 6. Referring now to the figure, an image to be segmented is provided at step 61. The shape tensor is calculated for voxel in the image whose median contrast enhancement exceeds a pre-defined threshold, as determined at step 62. The moments from which the shape tensor is defined are calculated at step 63 on a fixed size window about the selected voxel. At step 64, the eigenvalues of the shape tensor are calculated, and at step 65, the eccentricity of the underlying structure is determined. The process loops at step 66 until every voxel has been processed. The image is segmented at step 67 based on the eccentricities derived from the shape tensor.

Moment-based methods to extract local shape information can be compared to methods based on higher order image derivatives. For instance, the Gradient Square Tensor (GST), or structure tensor, has been proposed as a robust method to estimate local structure dimensionality. It is based on first order derivatives and hence could be called a structure descriptor of order one. The eigenvalues of the Hessian also provide local image structure information, as well as the principal curvatures of the isolevel at a given point. The Hessian and the principal curvatures are defined from second-order derivatives and hence could be called structure descriptors of order two. The shape tensor can be seen as a structure descriptor of order zero. It is based on integrals and hence has the property of being very robust to noise compared to methods based on either first or second order derivatives. In addition, there is no need to assume any differentiability on the image function, which simplifies the modeling. A problem with a shape tensor based method is that junctions are not detected. Also, a better understanding is needed to determine whether geometrical shape properties could be computed from the eigenvalues of the shape tensor with α>1.

It is to be understood that the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

Figure 7:
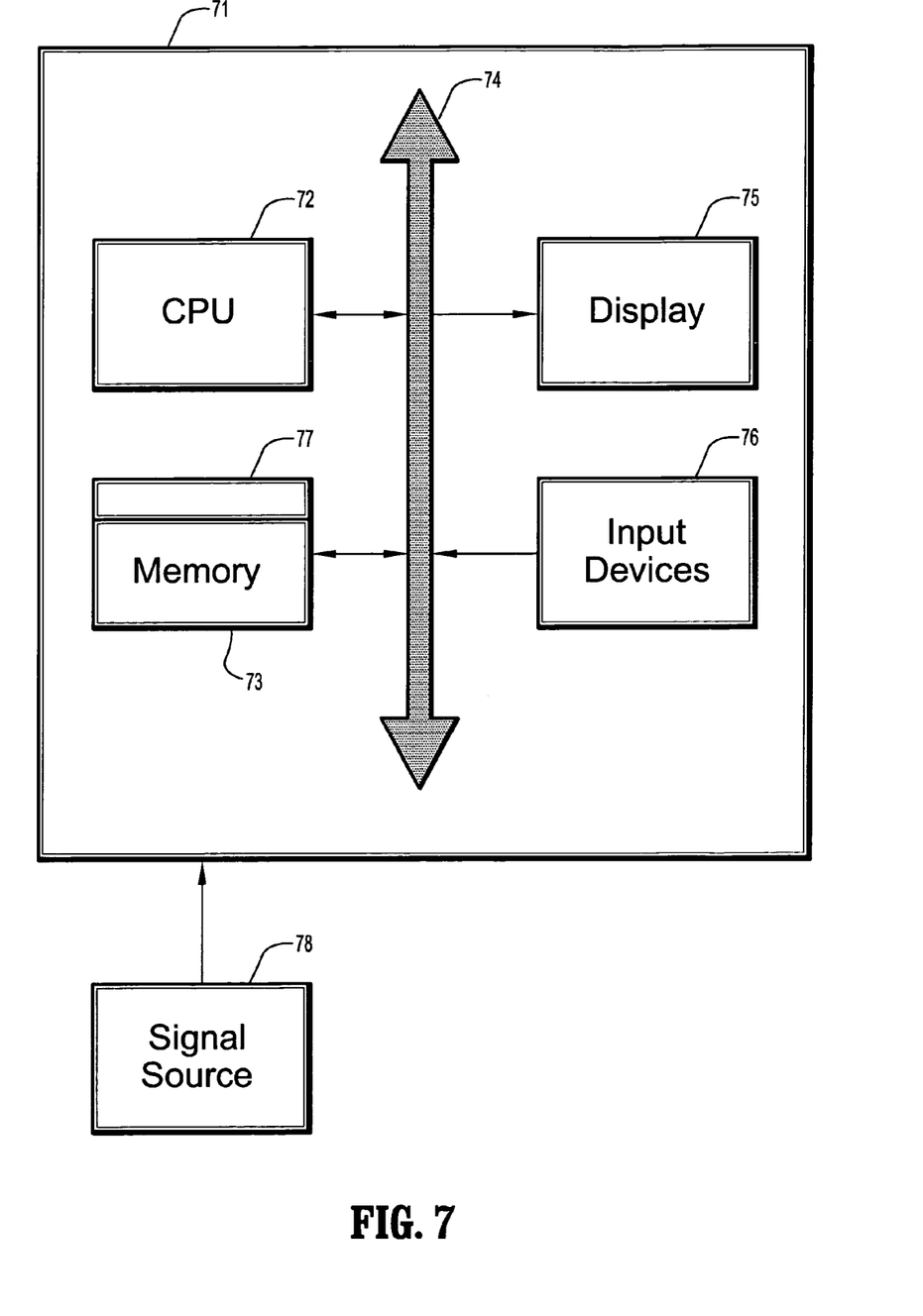
FIG. 7 is a block diagram of an exemplary computer system for implementing a moment-based segmentation method according to an embodiment of the invention.

FIG. 7 is a block diagram of an exemplary computer system for implementing a moment-based segmentation method according to an embodiment of the invention. Referring now to FIG. 7, a computer system 71 for implementing the present invention can comprise, inter alia, a central processing unit (CPU) 72, a memory 73 and an input/output (I/O) interface 74. The computer system 71 is generally coupled through the I/O interface 74 to a display 75 and various input devices 76 such as a mouse and a keyboard. The support circuits can include circuits such as cache, power supplies, clock circuits, and a communication bus. The memory 73 can include random access memory (RAM), read only memory (ROM), disk drive, tape drive, etc., or a combinations thereof. The present invention can be implemented as a routine 77 that is stored in memory 73 and executed by the CPU 72 to process the signal from the signal source 78. As such, the computer system 71 is a general purpose computer system that becomes a specific purpose computer system when executing the routine 77 of the present invention.

The computer system 71 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

While the present invention has been described in detail with reference to a preferred embodiment, those skilled in the art will appreciate that various modifications and substitutions can be made thereto without departing from the spirit and scope of the invention as set forth in the appended claims.

What is claimed is:

1. A computer-implemented method of segmenting digitized images, the method performed by said computer comprising the steps of:
   providing a digitized image comprising a plurality of intensities corresponding to a domain of points on a 3-dimensional grid;
   defining a shape matrix for a selected point in said image from moments of the intensities in a window of points about said selected point;
   calculating eigenvalues of said shape matrix;
   determining an eccentricity of a structure underlying said point from said eigenvalues, and
   segmenting said image based on said eccentricity values, wherein the steps of defining a shape matrix, calculating eigenvalues of said shape matrix, and determining the eccentricity of the underlying structure are repeated for all points in said image.

2. The method of claim 1, wherein said selected point has a median enhancement greater than a predefined threshold, wherein a contrast enhancing agent was applied to the subject matter of said digitized image prior to acquisition of said image.

3. The method of claim 2, wherein said median enhancement is calculated by taking a difference of a median value of said contrast enhanced image and a median value of a pre-contrast enhanced image, and normalizing said difference to be within a predefined range.

4. The method of claim 1, wherein said shape matrix $S_\alpha$ is defined as $$S_\alpha = \begin{pmatrix} \mu_{xx,\alpha} & \mu_{xy,\alpha} & \mu_{xz,\alpha} \\ \mu_{xy,\alpha} & \mu_{yy,\alpha} & \mu_{yz,\alpha} \\ \mu_{xz,\alpha} & \mu_{yz,\alpha} & \mu_{zz,\alpha} \end{pmatrix}, \text{ wherein}$$

$$\mu_{xx,\alpha} = \frac{m_{2,0,0,\alpha}}{m_{0,0,0,\alpha}} - \frac{m_{1,0,0,\alpha}^2}{m_{0,0,0,\alpha}^2},$$

$$\mu_{xy,\alpha} = \frac{m_{1,1,0,\alpha}}{m_{0,0,0,\alpha}} - \frac{m_{1,0,0,\alpha} m_{0,1,0,\alpha}}{m_{0,0,0,\alpha}^2},$$

$$\mu_{yy,\alpha} = \frac{m_{0,2,0,\alpha}}{m_{0,0,0,\alpha}} - \frac{m_{0,1,0,\alpha}^2}{m_{0,0,0,\alpha}^2},$$

$$\mu_{xz} = \frac{m_{1,0,1,\alpha}}{m_{0,0,0,\alpha}} - \frac{m_{1,0,0,\alpha} m_{0,0,1,\alpha}}{m_{0,0,0,\alpha}^2},$$

$$\mu_{yz} = \frac{m_{0,1,1,\alpha}}{m_{0,0,0,\alpha}} - \frac{m_{0,1,0,\alpha} m_{0,0,1,\alpha}}{m_{0,0,0,\alpha}^2},$$

-continued $$\mu_{zz,\alpha} = \frac{m_{0,0,2,\alpha}}{m_{0,0,0,\alpha}} - \frac{m_{0,0,1,\alpha}^2}{m_{0,0,0,\alpha}^2},$$

wherein moments $m_{p,q,r,\alpha}$ are defined as $m_{p,q,r,\alpha}(x_0, y_0, z_0) = \int_{R^3} (x-x_0)^p (y-y_0)^q (z-z_0)^r f(x, y, z)^\alpha w(x-x_0, y-y_0, z-z_0) dx dy dz,$ wherein $f$ is the image intensity function, w is a window function with compact support, p, q, r≧0 and α≧1.

5. The method of claim 4, wherein the integral is calculated by a sum over a finite neighborhood about each point.

6. The method of claim 4, wherein said window function is defined by $$w(x, y, z) = \begin{cases} 1 & \text{if } \begin{cases} x \in [-N_x v_x, N_x v_x] \\ y \in [-N_y v_y, N_y v_y], \\ z \in [-N_z v_z, N_z v_z] \end{cases} \\ 0 & \text{otherwise} \end{cases}$$

wherein $v_x$, $v_y$, $v_z$ are image point spacings, $N_x$, $N_y$, $N_z$ are non-negative integers defined wherein a window size contains a largest diameter of interest.

7. The method of claim 4, further comprising computing said moments using nearest neighbor interpolation, and correcting said shape matrix according to $$\hat{S}_\alpha + \frac{1}{12} \begin{pmatrix} v_x^2 & 0 & 0 \\ 0 & v_y^2 & 0 \\ 0 & 0 & v_z^2 \end{pmatrix},$$

wherein $v_x$, $v_y$, $v_z$ are image point spacings.

8. The method of claim 4, further comprising computing said moments using trilinear interpolation.

9. The method of claim 8, wherein α=1, and correcting said shape matrix according to $$\hat{S}_\alpha + \frac{1}{6} \begin{pmatrix} v_x^2 & 0 & 0 \\ 0 & v_y^2 & 0 \\ 0 & 0 & v_z^2 \end{pmatrix},$$

wherein $v_x$, $v_y$, $v_z$ are image point spacings.

10. A computer implemented method of segmenting digitized images, the method performed by said computer comprising the steps of:
    providing a digitized image comprising a plurality of intensities corresponding to a domain of points on an 3-dimensional grid;
    defining a shape matrix for a selected point in said image from moments of the intensities in a window of points about said selected point, wherein said shape matrix $S_\alpha$ is defined as $$S_\alpha = \begin{pmatrix} \mu_{xx,\alpha} & \mu_{xy,\alpha} & \mu_{xz,\alpha} \\ \mu_{xy,\alpha} & \mu_{yy,\alpha} & \mu_{yz,\alpha} \\ \mu_{xz,\alpha} & \mu_{yz,\alpha} & \mu_{zz,\alpha} \end{pmatrix},$$

wherein $$\mu_{xx,\alpha} = \frac{m_{2,0,0,\alpha}}{m_{0,0,0,\alpha}} - \frac{m_{1,0,0,\alpha}^2}{m_{0,0,0,\alpha}^2},$$

$$\mu_{xy,\alpha} = \frac{m_{1,1,0,\alpha}}{m_{0,0,0,\alpha}} - \frac{m_{1,0,0,\alpha} m_{0,1,0,\alpha}}{m_{0,0,0,\alpha}^2},$$

-continued $$\mu_{yy,\alpha} = \frac{m_{0,2,0,\alpha}}{m_{0,0,0,\alpha}} - \frac{m_{0,1,0,\alpha}^2}{m_{0,0,0,\alpha}^2},$$

$$\mu_{xz,\alpha} = \frac{m_{1,0,1,\alpha}}{m_{0,0,0,\alpha}} - \frac{m_{1,0,0,\alpha} m_{0,0,1,\alpha}}{m_{0,0,0,\alpha}^2},$$

$$\mu_{yz,\alpha} = \frac{m_{0,1,1,\alpha}}{m_{0,0,0,\alpha}} - \frac{m_{0,1,0,\alpha} m_{0,0,1,\alpha}}{m_{0,0,0,\alpha}^2},$$

$$\mu_{zz,\alpha} = \frac{m_{0,0,2,\alpha}}{m_{0,0,0,\alpha}} - \frac{m_{0,0,1,\alpha}^2}{m_{0,0,0,\alpha}^2},$$

wherein moments $m_{p,q,r,\alpha}$ are defined as $$m_{p,q,r,\alpha}(x_0, y_0, z_0) = \int_{R^3} (x-x_0)^p (y-y_0)^q (z-z_0)^r f(x,y,z)^\alpha w(x-x_0, y-y_0, z-z_0) dx dy dz,$$

wherein $f$ is the image intensity function, w is a window function with compact support, p, q, r $\geq$ 0 and $\alpha \geq$ 1;
    calculating eigenvalues of said shape matrix; and
    determining an eccentricity of a structure underlying said point from said eigenvalues.

11. The method of claim 10, further comprising repeating the steps of defining a shape matrix, calculating eigenvalues of said shape matrix, and determining the eccentricity of the underlying structure for all points in said image, and segmenting said image based on said eccentricity values.

12. A program storage device readable by a computer, tangibly embodying a program of instructions executable by the computer to perform the method steps for segmenting digitized images, comprising the steps of:
    providing a digitized image comprising a plurality of intensities corresponding to a domain of points on a 3-dimensional grid;
    defining a shape matrix for a selected point in said image from moments of the intensities in a window of points about said selected point;
    calculating eigenvalues of said shape matrix;
    determining an eccentricity of a structure underlying said point from said eigenvalues, and
    segmenting said image based on said eccentricity values, wherein the steps of defining a shape matrix, calculating eigenvalues of said shape matrix, and determining the eccentricity of the underlying structure are repeated for all points in said image.

13. The computer readable program storage device of claim 12, wherein said selected point has a median enhancement greater than a predefined threshold, wherein a contrast enhancing agent was applied to the subject matter of said digitized image prior to acquisition of said image.

14. The computer readable program storage device of claim 13, wherein said median enhancement is calculated by taking a difference of a median value of said contrast enhanced image and a median value of a pre-contrast enhanced image, and normalizing said difference to be within a predefined range.

15. The computer readable program storage device of claim 12, wherein said shape matrix $S_\alpha$ is defined as $$S_\alpha = \begin{pmatrix} \mu_{xx,\alpha} & \mu_{xy,\alpha} & \mu_{xz,\alpha} \\ \mu_{xy,\alpha} & \mu_{yy,\alpha} & \mu_{yz,\alpha} \\ \mu_{xz,\alpha} & \mu_{yz,\alpha} & \mu_{zz,\alpha} \end{pmatrix},$$

wherein $$\mu_{xx,\alpha} = \frac{m_{2,0,0,\alpha}}{m_{0,0,0,\alpha}} - \frac{m_{1,0,0,\alpha}^2}{m_{0,0,0,\alpha}^2},$$

$$\mu_{xy,\alpha} = \frac{m_{1,1,0,\alpha}}{m_{0,0,0,\alpha}} - \frac{m_{1,0,0,\alpha} m_{0,1,0,\alpha}}{m_{0,0,0,\alpha}^2},$$

$$\mu_{yy,\alpha} = \frac{m_{0,2,0,\alpha}}{m_{0,0,0,\alpha}} - \frac{m_{0,1,0,\alpha}^2}{m_{0,0,0,\alpha}^2},$$

$$\mu_{xz,\alpha} = \frac{m_{1,0,1,\alpha}}{m_{0,0,0,\alpha}} - \frac{m_{1,0,0,\alpha} m_{0,0,1,\alpha}}{m_{0,0,0,\alpha}^2},$$

$$\mu_{yz,\alpha} = \frac{m_{0,1,1,\alpha}}{m_{0,0,0,\alpha}} - \frac{m_{0,1,0,\alpha} m_{0,0,1,\alpha}}{m_{0,0,0,\alpha}^2},$$

$$\mu_{zz,\alpha} = \frac{m_{0,0,2,\alpha}}{m_{0,0,0,\alpha}} - \frac{m_{0,0,1,\alpha}^2}{m_{0,0,0,\alpha}^2},$$

wherein moments $m_{p,q,r,\alpha}$ are defined as $$m_{p,q,r,\alpha}(x_0, y_0, z_0) = \int_{R^3} (x-x_0)^p (y-y_0)^q (z-z_0)^r f(x,y,z)^\alpha w(x-x_0, y-y_0, z-z_0) dx dy dz,$$

wherein $f$ is the image intensity function, w is a window function with compact support, p, q, r $\geq$ 0 and $\alpha \geq$ 1.

16. The computer readable program storage device of claim 15, wherein the integral is calculated by a sum over a finite neighborhood about each point.

17. The computer readable program storage device of claim 15, wherein said window function is defined by $$w(x,y,z) = \begin{cases} 1 & \text{if } \begin{cases} x \in [-N_x v_x, N_x v_x] \\ y \in [-N_y v_y, N_y v_y] \\ z \in [-N_z v_z, N_z v_z] \end{cases} \\ 0 & \text{otherwise} \end{cases},$$

wherein $v_x$, $v_y$, $v_z$ are image point spacings, $N_x$, $N_y$, $N_z$ are non-negative integers defined wherein a window size contains a largest diameter of interest.

18. The computer readable program storage device of claim 15, the method further comprising computing said moments using nearest neighbor interpolation, and correcting said shape matrix according to $$\hat{S}_\alpha + \frac{1}{12} \begin{pmatrix} v_x^2 & 0 & 0 \\ 0 & v_y^2 & 0 \\ 0 & 0 & v_z^2 \end{pmatrix},$$

wherein $v_x$, $v_y$, $v_z$ are image point spacings.

19. The computer readable program storage device of claim 15, the method further comprising computing said moments using trilinear interpolation.

20. The computer readable program storage device of claim 19, wherein $\alpha=1$, and correcting said shape matrix according to $$\hat{S}_\alpha + \frac{1}{6} \begin{pmatrix} v_x^2 & 0 & 0 \\ 0 & v_y^2 & 0 \\ 0 & 0 & v_z^2 \end{pmatrix},$$

wherein $v_x$, $v_y$, $v_z$ are image point spacings.

\* \* \* \* \*